Figure 1:
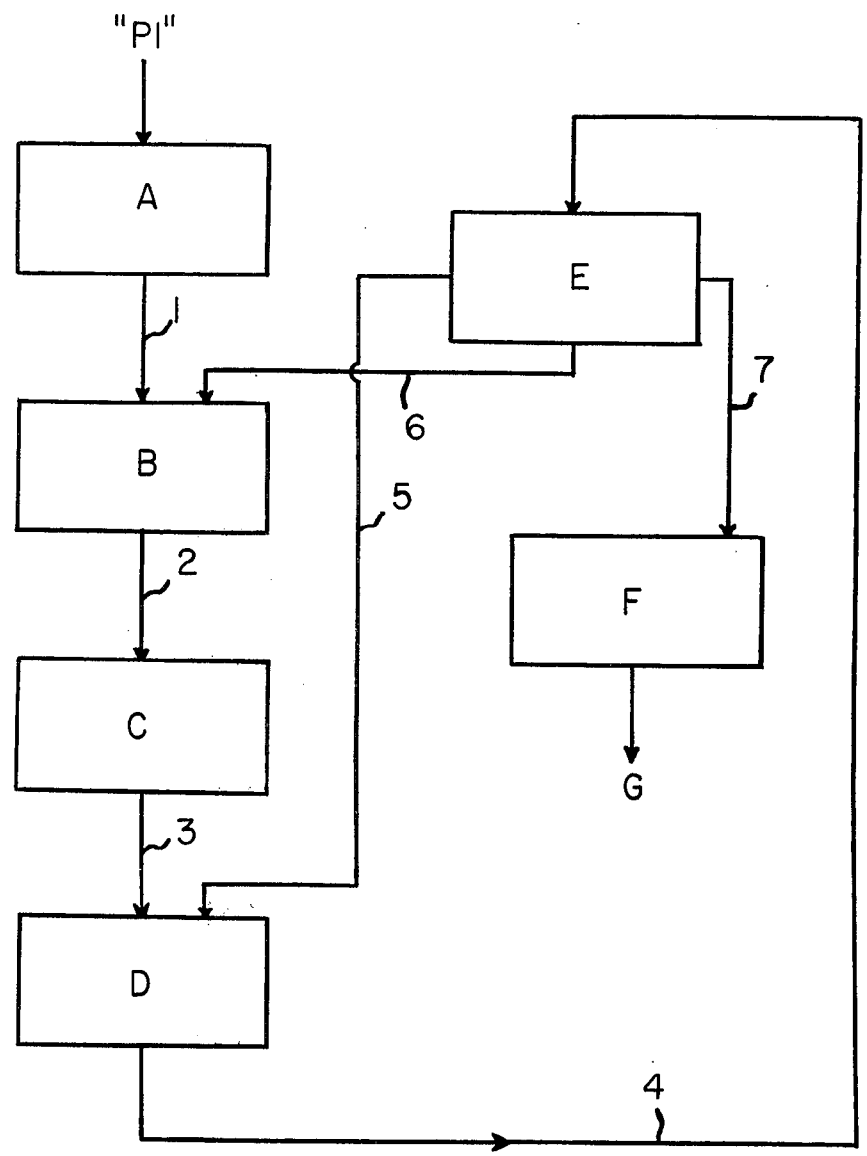

United States Patent [19]

Mercier et al.

[11] 4,159,313
[45] Jun. 26, 1979

[54] ALUMINA AGGLOMERATES WITH GOOD MECHANICAL STRENGTH AND A METHOD OF OBTAINING THEM

[75] Inventors: Henry Mercier; Joseph Cohen, both of Gardanne; Pierre Maurel, Aix en Provence, all of France

[73] Assignee: Aluminum Pechiney, Lyon, France

[21] Appl. No.: 818,204

[22] Filed: Jul. 22, 1977

[30] Foreign Application Priority Data

| Jul. 23, 1976 | [FR] | France | 76 23128 |
| Jul. 23, 1976 | [FR] | France | 76 23129 |
| Jul. 23, 1976 | [FR] | France | 76 23130 |
| Jul. 23, 1976 | [FR] | France | 76 23131 |

[51] Int. Cl.² ............................................. C01F 7/02
[52] U.S. Cl. ................................. 423/625; 423/626; 423/631; 423/556
[58] Field of Search .................... 106/288 B, 309; 423/625, 626, 631, 556

[56] References Cited

U.S. PATENT DOCUMENTS

| 2,006,851 | 7/1935 | Wiedbrauck | 423/626 |
| 3,169,827 | 2/1965 | De Rosset | 423/626 |
| 3,366,446 | 1/1968 | Kelly et al. | 423/625 |

*Primary Examiner*—Patrick Garvin
*Assistant Examiner*—J. V. Howard
*Attorney, Agent, or Firm*—Dennison, Dennison, Meserole & Pollack

[57] ABSTRACT

Alumina agglomerates with high mechanical strength and selectable particle size are obtained by compacting an intermediate product resulting from incomplete decomposition of a substance of the group comprising hexahydrated aluminum chloride, hydrated aluminum nitrate, hydrated aluminum sulfate of the formula $Al_2O_3, xSO_3, yH_2O$ and hydrated aluminum sulfite of the formula $Al_2O_3, xSO_2, yH_2O$, which after thermal decomposition contain from 0.5 to 15% by weight of Cl, of nitrogen oxide expressed as $N_2O_5$ or of sulfur expressed as $SO_3$ or $SO_2$, which compacted product is then granulated and the granulated product subjected to heat treatment.

7 Claims, 1 Drawing Figure

ALUMINA AGGLOMERATES WITH GOOD MECHANICAL STRENGTH AND A METHOD OF OBTAINING THEM

The invention concerns alumina agglomerates with high mechanical strength and a particle size which is selectable, so that the product is adapted to the technical requirements of the user, which product is obtained by compacting an intermediate product resulting from incomplete decomposition of a substance of the group comprising hexahydrated aluminum chloride, hydrated aluminum nitrates, hydrated aluminum sulfates of the formula $Al_2O_3$, $xSO_3$, $yH_2O$ and hydrated aluminum sulfites of the formula $Al_2O_3$, $xSO_2$, $yH_2O$, the compacting stage being followed by granulation and heat treatment of the granules. The invention also concerns methods of obtaining such alumina agglomerates.

The invention equally relates to alumina agglomerates with good mechanical strength compacted into various shapes, obtained by molding under pressure followed by heat treatment.

The industry which specializes in obtaining alumina and converting it into aluminum through fused bath electrolysis has long been encountering serious difficulties which they have attempted to resolve.

The first difficulty is the loss of alumina through dust formation. This is experienced when handling the material and when using it in the tanks for fused bath electrolysis. It was consequently found necessary to design expensive dust recovery installations.

Another difficulty which cropped up concerned the recovery of some elements which were contained in the gaseous effluent from tanks for fused bath electrolysis.

A technique which is commonly used nowadays for this purpose comprises creating intimate contact between the gaseous effluent and the alumina used for feeding the tanks.

Experts have confirmed that the alumina thus put into contact must have a BET specific surface area adapted to this practice, if the elements are to be satisfactorily absorbed.

A final difficulty which proved to be serious among all the others concerned the variations found in the particle size of the alumina. Experts wished to have a particle size which would remain substantially constant in time, so that the operation of the electrolytic tanks would not be adversely affected by such variations.

Because of these many difficulties and disadvantages experts wondered about the importance of putting alumina into an agglomerate form which would be particularly appropriate for fused bath electrolysis, so as to give a product where the desired properties would be reproducible, i.e., permanent in time.

With a view to finding a solution to these disadvantages, many methods of agglomerating alumina have been proposed and widely described in the literature.

A first type of process proposed comprised mechanically agglomerating a paste obtained by mixing a Bayer process alumina and an appropriate binder, which could be a solution of an acid, of aluminum salts such as aluminum nitrate, aluminum stearate, etc.

After agglomeration by extrusion, compacting or any other mechanical means, the granules obtained were calcined. Such processes were expensive and produced granular products which were polluted not only with small quantities of $Na_2O$ from the Bayer process itself but also with the binder or what was left of it after the heat treatment.

Another process, which was a marked improvement, was subsequently proposed. As described in French Pat. No. 2,267,982, it comprised producing an agglomerated active alumina, using the aluminum hydrate obtained by the Bayer process as the raw material.

This raw material, which could only contain a small quantity of impurities and more particularly sodium impurities, was first dried to eliminate the water of impregnation. It was then compacted, without adding any binder, by passing it continuously between two cylinders with the desired pressure set up between them. The continuous strip thus produced was fragmented to the desired dimensions and the fragments subjected to conventional activating heat treatment.

However, the various methods hitherto proposed concerned the agglomeration of a hydrated alumina obtained essentially by action on bauxite by the Bayer process. Apart from this basic process there are various acid methods of action on silico-aluminous ores which cannot be treated by the alkaline Bayer process, and these form an important stage in the preparation of pure alumina.

For this purpose, a method of converting or purifying hexahydrated aluminum chloride is described in French Pat. No. 1,419,879. This forms an important stage in the preparation of pure alumina from silico-aluminous ores which cannot be treated by the alkaline Bayer process, and for which acid reagents are used to convert the alumina in the ore into a hydrated chloride.

However, hexahydrated aluminum chloride obtained by precipitation is known to be in the form of small rods, the length of which varies from $50\mu$ to $1500\mu$ according to the crystallizing conditions chosen.

When hydrated aluminum chloride is thermally decomposed in accordance with the equation: $2AlCl_3$, $6H_2O \rightarrow Al_2O_3 + 6HCl + 9H_2O$, at a temperature of, e.g., from 600° to 900° C. and in a static or dynamic bed, the alumina obtained is also in the form of small rods, equal in volume to about 35% of the volume of initial rods of hexahydrated aluminum chloride. The alumina rods are fragile and cannot easily tolerate the attrition which takes place both during heat treatment and during mechanical, pneumatic or other transferring operations.

For these reasons the alumina thus obtained is generally in the form of very fine particles, or dust, which are liable to fly away and which also have several of the above-mentioned disadvantages.

There is another process of acid action on silico-aluminous ores, comprising reacting the original ore with $HNO_3$. This is also an important intermediate stage in the preparation of pure alumina, by conversion of the alumina in the ore to a hydrated aluminum nitrate of the formula $(NO_3)_3Al$, $nH_2O$, where n is generally 9 but may be 8 or 6.

The nitrates are decomposed by heat treatment in accordance with the following equations

$N_2O_5$ may be decomposed into various other nitrogen oxides, according to the temperatures used.

It appeared possible to us to control the decomposition by varying the times and temperatures so as to obtain an incompletely decomposed, nitrated and hydrated "intermediate product".

When there is total decomposition of the hydrated aluminum nitrates, the alumina obtained is generally in the form of very fine particles, which are liable to fly away and which also have several of the above-mentioned disadvantages.

However, another acid process is known, comprising reacting the original ore with $H_2SO_4$. This also forms an important intermediate stage in the preparation of a pure alumina by the conversion of the alumina in the ore to a hydrated aluminum sulfate of the general formula $Al_2O_3$, $xSO_3$, $yH_2O$, where x and y may vary widely but correspond to sulfates known to experts, belonging to the group comprising hydrated acid, basic and neutral sulfates of aluminum.

x may generally have a value of 0.5 to 5 while y has a value of 0 to 18.

On thermal decomposition of the hydrated sulfate by the equation $Al_2O_3$, $xSO_3$, $yH_2O \rightarrow Al_2O_3 + xSO_3 + yH_2O$, it has been found possible to control decomposition, by varying the times and temperatures so as to obtain a sulfated and hydrated intermediate product which is incompletely decomposed.

When the hydrated aluminum sulfates are fully decomposed the alumina obtained is generally in the form of very fine particles, which are liable to fly away and also have several of the above-mentioned drawbacks.

Finally, another known process of acid action on silico-aluminous ores concerns the action of sulfurous acid on the previously calcined ore, at a relatively high pressure of 5 to 10 bars and a temperature below 100° C. The process is an important intermediate stage in the preparation of an alumina by the conversion of the alumina in the ore to a hydrated aluminum sulfite of the general formula $Al_2O_3$, $xSO_2$, $yH_2O$, wherein x and y may vary widely but correspond to the sulfites known in the art which belong to the group comprising the hydrated basic sulfites and a neutral sulfite of aluminum.

The value of x is generally from 0.2 to 3, while y has a maximum value of 5.

On thermal decomposition of the hydrated sulfite by the equation $Al_2O_3$, $xSO_2$, $yH_2O \rightarrow Al_2O_3 + xSO_2 + yH_2O$, it appeared possible to us to control the decomposition by varying the times and temperatures, so as to obtain an incompletely decomposed hydrated intermediate product still containing a small quantity of sulfur oxides.

When hydrated aluminum sulfites are completely decomposed the alumina obtained is generally in the form of fine particles, which are liable to fly away and also have several of the above-mentioned disavantages.

Because the alumina obtained by the above-mentioned methods of acid reaction was generally in the form of fine particles liable to fly away, it was desirable to envisage agglomerating it.

SUMMARY OF THE INVENTION

It has been discovered that it is possible to form alumina granules with high mechanical strength and a selected particle size, from one of the substances of the group comprising hexahydrated aluminum chloride, hydrated aluminum nitrates, hydrated aluminum sulfates and hydrated aluminum sulfites.

According to the invention, the new alumina agglomerate is characterized, in that it is obtained by compacting an "intermediate product", preferably in the dry state, resulting from incomplete decomposition of a substance of the group comprising hexahydrated aluminum chloride, hydrated aluminum nitrate, a hydrated aluminum sulfate of the formula $Al_2O_3$, $xSO_3$, $yH_2O$, a hydrated aluminum sulfite of the formula $Al_2O_3$, $xSO_2$, $yH_2O$, which after thermal decomposition contain from 0.5 to 15% by weight of Cl, of nitrogen oxide expressed as $N_2O_5$ or of S expressed as $SO_3$ or $SO_2$ which compacted product is then granulated and the granulated product subjected to heat treatment.

The intermediate product to be compacted is obtained from incomplete thermal decomposition of the above-mentioned hydrated substance resulting from the action of acid on silico-aluminous ores, so that the chlorine content is preferably from 2 to 10% by weight, the content of nitrogen oxide expressed as $N_2O_5$ preferably from 2 to 8% by weight, the sulfur content expressed as $SO_3$ preferably from 3 to 10% by weight, and finally the sulfur content expressed as $SO_2$ preferably from 5 to 10% by weight.

The incomplete decomposition of the substance is carried out by methods known in the art.

As already mentioned, the intermediate product is normally compacted dry. However, it has been found that the addition of a certain amount of water to the product to be compacted does not substantially affect the final properties of the alumina agglomerates, provided that the quantity of water does not exceed the following percentages by weight of the product:

20% for an alumina obtained by incomplete decomposition of hydrated chloride

15% for an alumina obtained by incomplete decomposition of hydrated nitrate

15% for an alumina obtained by incomplete decomposition of a hydrated sulfate

10% for an alumina obtained by incomplete decomposition of a hydrated sulfite.

The intermediate product as defined is then subjected to the agglomerating process.

FIGURE DESCRIPTION

FIG. 1 is a flow diagram of an exemplary method of producing the alumina agglomerate of the present invention.

In this process, the intermediate product, P.I., stored at A, is passed through 1 into a mixer B, which also receives through 6 a fraction comprising granulated products of dimensions smaller than those required. It is then passed through 2 into a unit C where compacting is carried out continuously. The unit C has a pressing means, which may e.g. be a cylinder compacter of the conventional type with an associated precompacting means. The compacting pressure, expressed in tons per linear centimeter across the width of the cylinders, is at least 3 tons per linear centimeter when the alumina results from incomplete decomposition of the hydrated chloride or a hydrated nitrate, at least 0.5 tons per linear centimeter when the alumina results from incomplete decomposition of a sulfate of the formula $Al_2O_3$, $xSO_3$, $yH_2O$, and at least 1 ton per linear cntimeter when the alumina results from decomposition of a sulfite of the formula $Al_2O_3$, $xSO_2$, $yH_2O$.

The compacted product is then in the form of a continuous strip, which is roughly, i.e., coarsely, fragmented on leaving the compacting stage and taken through 3 to D where it is fragmented to the desired dimensions. This is done with a known type of comminution apparatus, such as spiked cylinders, jaw-type crushers, hammer mills, etc.

The granules leaving the fragmentation stage D are directed through 4 to a selecting zone E, where they are divided into at least three grades α, β and γ of different dimensions.

Grade α comprises granules of dimensions which come within the range of measurements desired by the subsequent user. This grade is passed through 7 to a known type of furnace F, where heat treatment is applied at the appropriate temperature to provide alumina with the desired properties, e.g., from 600° to 1500° C.

Grade β comprising undersize granules is conveyed through 6 into mixer B for recycling into the process.

Grade γ, comprising oversize granules, is conveyed through 5 to D, where it is refragmented then returned through 4 to selection zone E.

After heat treatment at F grade α is collected at G ready for use.

In a modified form of the process, the continuous compacting unit C may comprise a pelletizing press, the compacting pressure of which is selected according to what the intermediate product is made from. When the intermediate product is obtained by incomplete decomposition of hexahydrated aluminum chloride, the compacting pressure chosen is from 2000 to 10000 kgF/cm$^2$. But when the intermediate product results from incomplete decomposition of hydrated aluminum nitrate, the compacting pressure is at least 1500 kgF/cm$^2$ and preferably from 3000 to 5000 kgF/cm$^2$. When the intermediate product results from incomplete decomposition of hydrated aluminum sulfate, the compacting pressure is at least 200 kgF/cm$^2$. And finally, where the intermediate product results from incomplete decomposition of hydrated aluminum sulfite, the compacting pressure must be at least 600 kgF/cm$^2$.

The pelletized product is next placed in the comminutor, then follows the cycle of treatment previously described.

Since the heat treatment is without the use of any binder, the alumina agglomerates have particularly interesting physical properties, apart from that of maintaining a regular particle size which can be selected according to the wishes of the ultimate user.

The residual metalloid content (Cl,N,S) of the alumina agglomerates is generally speaking very low, but depends on the conditions of heat treatment.

Thus, the chlorine content ranges from 0.005 to 0.5%, while the nitrogen oxide content expressed as $N_2O_5$ is from 0 to 0.5%, the sulfur content expressed as $SO_3$ is less than 1% for ex-sulfates, and the sulfur content expressed as $SO_2$ for ex-sulfites is less than 0.6%.

The specific surface area, measured by nitrogen absorption in accordance with AFNOR Standard XII-621, also depends on the conditions of heat treatment. Thus the BET specific surface area of alumina agglomerates obtained by incomplete decomposition of hydrated aluminum chloride is preferably from 2 to 120 m$^2$/g and their α alumina content is between 95% and 0%. The BET specific surface area of alumina agglomerates resulting from incomplete decomposition of hydrated aluminum nitrate and hydrated aluminum sulfate is from 2 to 150 m$^2$/g, while the BET specific surface area of alumina agglomerates resulting from incomplete decomposition of hydrated aluminum sulfite is from 2 to 130 m$^2$/g.

Finally, the alumina agglomerates according to the invention have very good resistance to attrition, which is shown by their good resistance to crumbling when subjected to repeated thermal and mechanical shocks.

According to the invention it is also possible to make agglomerates in well defined shapes by techniques known in the art, such as molding under pressure, extrusion, etc. In this way it is possible to produce, e.g., balls of varying dimensions, solid or hollow cylinders, small plates, grooved pulleys, counter-rotating wheels and the like. The heat treatment subsequent to the shaping process then follows a selected heating cycle, determined by the uses for which the shaped articles are intended.

Other features and advantages of the invention will be understood better from the examples of how the process is carried out.

EXAMPLE 1

15 kg of grade β, comprising fines screened to 1 millimeter and obtained from previous operations carried out under the same industrial conditions, is mixed at B with 15 kg of intermediate product resulting from incomplete decomposition of hexahydrated aluminum chloride, the mix still containing 4.55% by weight of chlorine. The mix is precompacted in a conical vessel with a spiral conveyor turning within it, the spiral conveyor fitting the conical shape of the hopper.

The base of the precompacter discharges directly into the compacter, which comprises two opposed cylinders 600 mm in diameter fitted with apertured bands, the bands of the cylinders being 1.5 mm away from one another before the product is introduced.

The squeezing pressure, which is kept constant throughout the operation, is 6 tons per centimeter across the width of a band.

The speed of rotation is 4 revolutions per minute.

On leaving C the small discs produced by the compacter are collected and are fed into a hammer mill D, fitted with a screen with a mesh having apertures of 6.5 millimeters. The granules thus obtained are screened at E in an apparatus which separates them into four grades:

(1) a grade larger than 5 millimeters, which is directed to granulator D and which constitutes about 2% by weight of the mass of granules (2) a 2–5 millimeter grade, desired by the user, which constitutes about 43% by weight of the mass of granules (3) a 1–2 millimeter grade, also desired, constituting about 18% by weight of the mass of granules (4) a grade smaller than 1 millimeter, constituting about 37% by weight of the mass of granules, which is recycled to B.

The 2–5 millimeter and 1–2 millimeter grades are calcined separately at G at different temperatures and, as a function of these temperatures, show the specific properties set out in the table below:

| grades | calcining temperature | percent weight loss on heating | % Cl | BET | Attrition Test apparent density kg/cm³ | fines formed %<160μ | average diameter before in μ | average diameter afterwards in μ |
|---|---|---|---|---|---|---|---|---|
| 2-5 millimeters | initially untreated, not calcined | — | 4.55 | — | 0.78 | 0.02 | 3050 | 2900 |
|  | 850° C. | 10.9 | 0.3 | 72 | 0.74 | 0.16 | 2800 | 2650 |
|  | 950° C. | 12.35 | 0.26 | 39 | 0.74 | 0.16 | 2850 | 2600 |
|  | 1050° C. | 13.4 | 0.07 | 20 | 0.73 | 0.04 | 3050 | 2850 |
| 1-2 millimeters | 850° C. | 11.0 | 0.3 | 69 | 0.68 | 2.5 | 1080 | 1020 |
|  | 900° C. | 12.0 | 0.28 | 47 | 0.65 | 1.0 | 1150 | 1020 |

The attrition test is carried out with a mixer comprising a cylindrical glass receptacle with a capacity of 250 cc, an internal diameter of 55 mm and an internal length of 105 mm. A complex three-dimensional movement is imparted to the receptacle, producing effects of shaking, rotation and rhythmical rocking.

50 g of alumina agglomerates left behind on previous sieving at 160μ is placed in the cylindrical receptacle. Then the sample is subjected to continuous agitation for two hours, after which time it is resieved at 160μ. In this way the percentage of "fines" created during the attrition test is determined.

Finally, the average diameter is measured before and after attrition, by methods known in the art.

This first example thus demonstrates the essential properties of the alumina agglomerates for specific compacting properties and for a chlorine content of 4.55% in the intermediate product.

EXAMPLE 2

The purpose of this example is to show that the chlorine content of the intermediate product is a factor which determines the fundamental properties of the agglomerates according to the invention.

15 kg of grade β comprising fines screened at 1 mm is mixed with 15 kg of intermediate product at B. As in Example 1 the mix still contains 2.5% by weight of chlorine.

The mix is compacted under the conditions described in Example 1, except that the speed of rotation of the cylinders is reduced from 4 revolutions per minute to 2 revolutions per minute.

After screening at E the following grades are collected:

(1) a grade larger than 5 millimeters, representing about 1% of the mass of granules (2) the required 2-5 millimeter grade, representing about 28% of the mass of granules (3) the 1-2 millimeter grade, also required, representing about 17% of the mass of granules (4) a grade smaller than 1 millimeter, representing about 54% of the mass of granules, which is recycled to B.

As a comparison, a mixture of fines and intermediate product where the chlorine content before compacting is 0.5% by weight is also compacted under identical operating conditions.

After screening the following grades are collected:

(1) a grade larger than 5 millimeters: about 1% of the mass of granules (2) a desired 2-5 millimeter grade: about 24% of the mass of granules (3) a 1-2 millimeter grade, also desired: about 11% of the mass of granules (4) a grade smaller than 1 millimeter: about 64% of the mass of granules.

Compared with granules containing 2.5% of chlorine, granules containing 0.9% are found to be relatively friable.

The 2-5 millimeter grades are calcined at various temperatures, revealing the differences in mechanical strength on application of the attrition test as a function of these temperatures. These differences are set out in the table as follows:

| % Cl in intermediate product | Calcining temperature in °C. | Apparent density kg/cm³ | Attrition test fines formed % <160μ | average diameter before in μ | average diameter afterwards in μ |
|---|---|---|---|---|---|
| 0.99% | not calcined | 0.96 | 19.7 | 3100 | 2600 |
|  | 850° | 0.87 | 10.5 | 3000 | 2750 |
|  | 950° | 0.86 | 9.7 | 2900 | 2750 |
|  | 1050° | 0.88 | 7.4 | 3000 | 2800 |
| 2.5% | not calcined | 0.83 | 10.8 | 2650 | 2500 |
|  | 850° | 0.78 | 9.5 | 2650 | 2500 |
|  | 950° | 0.78 | 6.7 | 2800 | 2600 |
|  | 1050° | 0.79 | 2.5 | 2750 | 2600 |

Granules obtained from intermediate products with a lower chlorine content are not as strong.

EXAMPLES 3 TO 5

3 samples of intermediate product, respectively containing about 1.2%, 4.4% and 12.7% by weight of chlorine, are pelletized.

To prove that the presence of water does not adversely affect the mechanical properties of the pellets formed, the intermediate products are wetted with a quantity of water representing about 10% or 20% by weight of the mass of intermediate products.

When the samples have been homogeneously mixed compacting is carried out using a hydraulic press where the pressure is varied from 3100 to 7700 kgF/cm².

The pellets have a diameter of approximately 20.3 millimeters and a thickness which varies from about 7 to 11 millimeters depending on the quantity of intermediate product introduced.

After drying at 110° C., the pellets are calcined in a muffle furnace, which is heated gradually from 200° to 900° C. with the temperature rising 3.4° C. per minute.

The physical properties of the pellets after heat treatment can be seen from the summarizing table which follows:

| % Cl in intermediate product | % H$_2$O wetting | pelletizing pressure kgF/cm$^2$ | apparent average density after heat treatment | height, in cm, of ball drop resulting in breaking |
|---|---|---|---|---|
| 1.2 | 10 | 3100 | 1.03 | 20 |
|  |  | 4600 | 1.23 | 25 |
|  |  | 6200 | 1.31 | 25 |
| 4.4 | 10 | 3100 | 1.12 | 75 |
|  |  | 4600 | 1.24 | 100 |
|  |  | 6200 | 1.34 | 100 |
|  |  | 7700 | 1.38 | 100 |
|  | 20 | 3100 | 1.13 | 75 |
|  |  | 4600 | 1.32 | 150 |
|  |  | 6200 | 1.36 | 100 |
|  |  | 7700 | 1.42 | 75 |
| 12.7 | 10 | 3100 | 1.12 | 20 |
|  |  | 4600 | 1.16 | 10 |
|  |  | 6200 | 1.22 | 10 |
|  |  | 7700 | 1.20 | 10 |
|  | 20 | 3100 | 1.30 | 10 |
|  |  | 4600 | 1.33 | 10 |
|  |  | 6200 | 1.36 | 10 |
|  |  | 7700 | 1.35 | 10 |

The pellet breaking test is carried out by dropping a steel ball, 18.25 mm in diameter and 24.80 g in weight, which is guided in a glass tube 20 mm in diameter. The ball falls on the center of the pellet. Glass tubes of increasing height are used until a single drop of the ball causes the pellet to break.

EXAMPLE 6

The purpose is to measure the comparative effect of the size of the agglomerates according to the invention, and of an alumina of the same origin of various sizes which have not undergone the agglomeration cycle according to the invention, on chlorine content and BET surface area for specific temperatures and periods of calcination.

To this end three samples are used, made up as follows:

(1) a sample A comprising alumina granules with dimensions between 0.5 and 1 millimeter (2) a sample B comprising alumina granules with dimensions between 0.25 and 0.5 millimeter (3) a sample C resulting from incomplete decomposition of hexahydrated aluminum chloride with a fine particle size, the average diameter of the intermediate product being approximately 50μ.

These various samples are calcined in a fluidized bed furnace, the fluidizing gas being dry air.

The characteristics of the products thus treated can be seen from the table below:

|   | calcining temperature °C. | calcining time minutes | speed of fluidizing gas cm/sec | after treatment BET surface area cm$^2$/g | % Cl |
|---|---|---|---|---|---|
| A | 1000 | 90 | 32 | 52 | 0.13 |
|   |  | 120 |  | 51 | 0.06 |
|   |  | 60 |  | 37 | 0.036 |
|   | 1050 | 90 |  | 34 | <0.01 |
| B |  | 90 |  | 49 | 0.16 |
|   | 1000 | 120 | 15 | 51 | 0.07 |
|   |  | 60 |  | 32 | 0.05 |
|   | 1050 | 90 |  | 31 | <0.01 |
| C |  | 90 |  | 30 | 0.21 |
|   | 1000 | 120 | 17 | 30 | 0.15 |
|   |  | 60 |  | 22 | 0.09 |
|   | 1050 | 90 |  | 19 | 0.05 |

These results make it possible to measure the simultaneous change in the percentage of chlorine and in the BET specific surface areas, depending on whether or not the intermediate products treated have been agglomerated according to the invention.

EXAMPLE 7

An intermediate product containing 2.3% by weight of nitrogen oxide, expressed as N$_2$O$_5$, is pelletized at various pressures.

Compacting is effected with a hydraulic press where the pressure is varied from 2000 to 5000 kgF/cm$^2$.

The pellets have a diameter of approximately 24 mm and a thickness which varies from 5 to 7 mm, according to the quantity of intermediate product introduced.

The pellets thus obtained are then placed in a muffle furnace which has previously been brought to the selected calcination temperature, and are kept at that temperature for 2 hours.

The physical properties of the pellets after heat treatment can be seen from the summarizing table below:

| Pelletizing pressure kgF/cm$^2$ | Calcining temperature °C. | BET specific surface area m$^2$/g | Apparent average density after heat treatment kg/dm$^3$ | Attrition test: Height of drop of ball in cm |
|---|---|---|---|---|
| 2000 | 650° |  | 1.20 | 8–10 |
| 3000 | 650° |  | 1.24 | 10–20 |
| 4000 | 650° | 127 | 1.26 | 20 |
| 5000 | 650° |  | 1.33 | 10–20 |

| Pelletizing pressure kgF/cm² | Calcining temperature °C. | BET specific surface area m²/g | Apparent average density after heat treatment kg/dm³ | Attrition test: Height of drop of ball in cm |
|---|---|---|---|---|
| 2000 | 750° | | 1.32 | 8–10 |
| 3000 | 750° | | 1.36 | 10 |
| 4000 | 750° | 127 | 1.43 | 20 |
| 5000 | 750° | | 1.44 | 10–20 |
| 2000 | 850° | | 1.28 | 8–10 |
| 3000 | 850° | | 1.39 | 10–20 |
| 4000 | 850° | 124 | 1.36 | 10–20 |
| 5000 | 850° | | 1.41 | 10–20 |
| 2000 | 950° | | 1.47 | 8–10 |
| 3000 | 950° | | 1.54 | 8–10 |
| 4000 | 950° | 106 | 1.59 | 20 |
| 5000 | 950° | | 1.55 | 8–10 |

The BET surface area is measured by nitrogen absorption in accordance with AFNOR Standard XII-621.

The pellet breaking test is carried out by dropping a steel ball 18.25 mm in diameter and weighing 24.80 g, which is guided in a glass tube 20 mm in diameter. The ball drops on the center of the pellet. Glass tubes of increasing height are used until a single drop of the ball causes the pellet to break.

EXAMPLE 8

To demonstrate that the presence of water does not adversely affect the mechanical properties of the pellets made, the intermediate product, containing 2.6% of nitrogen oxide expressed as $N_2O_5$, is wetted with water, the amount of water being 5% by weight of its mass.

When the sample has been homogeneously mixed it is compacted with the same hydraulic press as in Example 1 with the pressure set to 4000 kgF/cm².

The pellets have a diameter of approximately 24 mm and a thickness of 5 to 7 mm, according to the quantity of intermediate product introduced.

After drying at 110° C., the pellets are placed in a muffle furnace which has previously been brought to the chosen calcining temperature, and are kept at that temperature for 2 hours.

The physical properties of the pellets after heat treatment are set out in the table which follows:

| Pressure exerted kgF/cm² | Calcining temperature °C. | Apparent average density after heat treatment kg/dm³ | Attrition test Height of drop of ball in cm |
|---|---|---|---|
| 4000 | 650° | 1.27 | 20–30 |
| 4000 | 750° | 1.36 | 10–20 |
| 4000 | 850° | 1.42 | 20–30 |
| 4000 | 950° | 1.59 | 10–20 |

EXAMPLE 9

An intermediate product containing 5.9% by weight of nitrogen oxide expressed as $N_2O_5$, is pelletized at various pressures.

Compacting is carried out under the same conditions as in Example 7.

The pellets obtained are placed in a muffle furnace which has previously been brought to the chosen calcining temperature, and are kept at that temperature for 2 hours.

The physical properties of the pellets after heat treatment are set out below:

| Pressure exerted kgF/cm² | Calcining temperature °C. | BET specific surface area m²/g | Apparent density after heat treatment kg/dm³ | Attrition test: Height of drop of ball in cm |
|---|---|---|---|---|
| 2000 | 750° | | 1.33 | 10–20 |
| 3000 | 750° | | 1.39 | 30 |
| 4000 | 750° | 107 | 1.35 | 20 |
| 5000 | 750° | | 1.43 | 8–10 |
| 2000 | 850° | | 1.40 | 8–10 |
| 3000 | 850° | | 1.46 | 8–10 |
| 4000 | 850° | 100 | 1.51 | 8–10 |
| 5000 | 850° | | 1.50 | 10–20 |

EXAMPLE 10

Intermediate products containing 3.8, 5.4 and 11.9% by weight of sulfur expressed as $SO_3$, and prepared by incomplete decomposition of $(SO_4)_3Al_2,18W_2O$, are pelletized under various pressures.

Compacting is effected with a hydraulic press where the pressure is varied from 400 to 3000 kgF/cm².

The pellets have a diameter of approximately 24 mm and a thickness which varies from 2 to 6 mm, according to the quantity of intermediate product introduced.

The pellets thus obtained are calcined at 1050° C. in a muffle furnace which is heated gradually with the temperature rising at 5° C. per minute.

The physical properties of the pellets after heat treatment can be seen from the summarizing table below:

| Intermediate product Content of S expressed as SO₃ % by weight | Pelletizing pressure kgF/cm² | BET surface area in m²/g after heat treatment | Apparent average density after heat treatment | Attrition test: Height of drop of ball in cm causing break |
|---|---|---|---|---|
| 11.9 | 3000 | 107 | 0.83 | 8 to 10 |
| 3.8 | 3000 | 104 | 1.17 | 8 to 10 |
| 5.4 | 800 | 95 | 0.88 | 8 to 10 |
| 5.4 | 400 | 100 | 0.7 | 5 |

The BET surface area is measured by nitrogen absorption in accordance with AFNOR Standard XII-621.

The pellet breaking test is carried out by dropping a steel ball 18.25 mm in diameter and weighing 24.80 g, which is guided in a glass tube 20 mm in diameter. The ball drops on the center of the pellet. Glass tubes of increasing height are used until a single fall of the ball causes the pellet to break.

EXAMPLE 11

To demonstrate that the presence of water does not adversely affect the mechanical properties of the pellets made, the intermediate product, the same as in Example 10, is wetted with water weighing about 5%, 7% and 15% of its mass.

When the sample has been homogeneously mixed it is compacted by means of the same hydraulic press as in Example 1.

The pellets have a diameter of approximately 24 mm and a thickness of 3 to 5 mm, depending on the quantity of intermediate product introduce.

After being dried at 110° C. the pellets are calcined at various temperature in a muffle furnace, which is heated gradually with the temperature rising 5° C. per minute.

The physical properties of the pellets after heat treatment are summarized in the table which follows:

| Intermediate product Content of S expressed as SO₃ % by weight | Content of H₂O expressed as % by weight | Pelletizing pressure in kgF/cm² | BET surface area in m²/g after heat treatment | Apparent average density after heat treatment | Attrition test: Height of drop of ball in cm causing break |
|---|---|---|---|---|---|
| 11.9 | 5 | 5000 | 105 | 1.45 | 8 to 10 |
| 3.8 | 7 | 1000 | 100 | 1.00 | 5 |
| 3.8 | 7 | 2000 | 98 | 1.32 | 8 to 10 |
| 3.8 | 7 | 3000 | 102 | 1.39 | 8 to 10 |
| 3.8 | 15 | 2000 | 95 | 1.33 | 5 |

EXAMPLE 12

Pellets previously obtained by pelletizing an intermediate product, containing 5.4% of S expressed as SO₃ at a pressure of 3000 kgF/cm², are calcined at 1300° C. in a muffle furnace, which is heated gradually with the temperature rising 5° C. per minute, and are kept at that temperature for 1 hour. The BET surface area is then 3 m²/g. The BET surface area is then 3 m²/g. The height from which the ball has to drop to break the pellets is approximately 5 cm.

EXAMPLE 13

An intermediate product containing 6.4% by weight of sulfur expressed as SO₂ and resulting from incomplete decomposition of Al₂O₃,2SO₂,5H₂O is pelletized.

Compacting is effected by means of a hydraulic press at a pressure of 3000 kgF/cm².

The pellets have a diameter of approximately 24 mm and a thickness which varies from 4 to 7 mm, according to the quantity of intermediate product introduced.

The pellets thus obtained are then calcined at 1050° C. in a muffle furnace, which is heated gradually with the temperature rising 5° C. per minute.

The physical properties of the pellets after heat treatment can be seen from the summarizing table below.

| Intermediate product Sulfur content expressed as SO₂ | Pelletizing pressure kgF/cm² | Apparent average density after heat treatment | Attrition test: Height of ball drop in cm |
|---|---|---|---|
| 6.4 | 3000 | 0.96 | 8 to 10 |

The pellet breaking test is carried out by dropping a steel ball, 18.25 mm in diameter and weighing 24.80 g, which is guided in a glass tube 20 mm in diameter. The ball drops on the center of the pellet. Glass tubes of increasing height are used until a single fall of the ball causes the pellet to break.

We claim:

1. Alumina agglomerates of high mechanical strength comprising a compacted, granulated, heat treated intermediate product resulting from incomplete decomposition of a substance selected from the group comprising hexahydrated aluminum chloride, hydrated aluminum nitrate, hydrated aluminum sulfate of the formula Al₂O₃, xSO₃, yH₂O and hydrated aluminum sulfite of the formula Al₂O₃, xSO₂, yH₂O, which after heat decomposition contain from 0.5 to 15% by weight of Cl, of nitrogen oxide expressed as N₂O₅ or of sulfur expressed as SO₃ or SO₂, and wherein x has a value of from 0.5 to 5 and y has a value of from 0 to 18.

2. Alumina agglomerates according to claim 1 wherein the intermediate product contains about 2 to 10% by weight of chlorine, about 2 to 8% by weight of nitrogen oxide, expressed as N₂O₅, 3% up to about 10% by weight of sulfur expressed as SO₃, and about 5 to 10% by weight of sulfur expressed as SO₂.

3. Alumina agglomerates according to claim 1 wherein the substance is hydrated aluminum sulfate, x is from 0.5 to 5 and y is from 0 to 18, and that said sulfate is a hydrated acid, basic or neutral aluminum sulfate.

4. Alumina agglomerates according to claim 1 wherein the substance is hydrated aluminum sulfite, x is from 0.2 to 3 and y is a maximum of 5, and that said sulfite is a hydrated basic or neutral sulfite of aluminum.

5. Alumina agglomerates according to claim 1 wherein the intermediate product compacted is moistened with a quantity of water, not exceeding 20% when the substance prior to heat treatment is hydrated aluminum chloride, not exceeding 15% by weight when the substance is hydrated aluminum nitrate or sulfate, and not exceeding 10% by weight when the substance is hydrated sulfite.

6. Alumina agglomerates according to claim 1 wherein the residual metalloid content (Cl, N and S) before compacting and heat treatment is 0 to 0.5% by weight Cl, 0 to 0.5% by weight of nitrogen oxide expressed as $N_2O_5$, 0 to 1% by weight of sulfur expressed as $SO_3$, and 0 to 0.6% by weight of sulfur expressed as $SO_2$.

7. Alumina agglomerates according to claim 1 wherein the BET specific surface area is from 2 to 150 $m^2/g$.

* * * * *